(12) United States Patent  (10) Patent No.: US 8,400,095 B2
Yang et al.                 (45) Date of Patent:     Mar. 19, 2013

(54) CONSTANT-SPEED CONTROL CIRCUIT FOR BLDC MOTORS

(75) Inventors: Ta-Yung Yang, Milpitas, CA (US); Ta-Hsu Huang, Wujie Township, Yilan County (TW); Chung-Hui Yeh, Banciao (TW); Pei-Sheng Tsu, Shulin (TW); Yi-Min Hsu, Taichung (TW); Shih-Jen Yang, Banciao (TW)

(73) Assignee: System General Corporation, Sindian, Taipei County (TW)

( * ) Notice: Subject to any disclaimer, the term of this patent is extended or adjusted under 35 U.S.C. 154(b) by 359 days.

(21) Appl. No.: 12/831,567

(22) Filed: Jul. 7, 2010

(65) Prior Publication Data

US 2011/0254498 A1    Oct. 20, 2011

Related U.S. Application Data

(60) Provisional application No. 61/342,413, filed on Apr. 14, 2010.

(51) Int. Cl.
    *G05B 11/26*   (2006.01)
(52) U.S. Cl. ............... 318/599; 318/400.01; 318/400.4; 330/252; 330/254

(58) Field of Classification Search ............. 318/400.01, 318/400.38, 400.07, 400.13, 599, 811, 400.4; 330/137, 141, 200, 252, 254
    See application file for complete search history.

(56) References Cited

U.S. PATENT DOCUMENTS 6,008,603 A * 12/1999 Jones et al. ............. 318/400.32
7,166,975 B2 * 1/2007 Mori et al. ............... 318/400.36
7,230,785 B2 * 6/2007 Itagaki et al. ............ 360/73.03

* cited by examiner

*Primary Examiner* — Antony M Paul
(74) *Attorney, Agent, or Firm* — McClure, Qualey & Rodack, LLP

(57) ABSTRACT

A speed-control circuit for a BLDC motor is provided. The speed-control circuit includes a pulse generator, a current source circuit, a filter circuit, an error amplification circuit and a PWM circuit. The pulse generator detects a speed signal of the BLDC motor to generate a pulse signal. The filter circuit is coupled to the current source circuit to generate an average signal. The error amplification circuit receives the average signal and a speed-reference signal for generating a speed-control signal. The PWM circuit generates a switching signal to drive the BLDC motor in response to the speed-control signal. A pulse width of the switching signal is determined by the speed-control signal.

8 Claims, 4 Drawing Sheets

CONSTANT-SPEED CONTROL CIRCUIT FOR BLDC MOTORS

CROSS REFERENCE TO RELATED APPLICATIONS

The present application claims the benefit of U.S. provisional application entitled "A Constant Speed Control Circuit for BLDC Motor", Ser. No. 61/342,413, filed Apr. 14, 2010.

BACKGROUND OF THE INVENTION

1. Field of the Invention

The present invention relates generally to BLDC (brushless direct current) motors, more specifically, the present invention relates to a speed-control circuit for BLDC motors.

2. Description of the Related Art

BLDC (brush-less direct current) motors are nowadays gaining popularity in automotive, consumer, and industrial applications. They have many advantages over traditional brushed DC motors, such as higher efficiency, linear speed and torque characteristics, low acoustic noise generation, wider speed range, less maintenance, and longer operating life.

Applications, such as ventilation system using BLDC motors as main ventilating component, suffer from magnetic aging problem. A long-term operation of the BLDC motor could cause its operation temperature to raise and reduce the magnetic force of its magnets. The operating speed of the BLDC motor might turn slower than its regular speed and therefore could dramatically affect the efficiency of the ventilation system.

Therefore, a control circuit capable of keeping the speed of the BLDC motor constant with simple design and low cost is desired by the industries.

BRIEF SUMMARY OF THE INVENTION

An exemplary embodiment of a speed-control circuit for a BLDC comprises a pulse generator, a current source circuit, a first filter circuit, an error amplification circuit and a PWM (Pulse Width Modulation) circuit. The pulse generator is coupled to detect a speed signal of the BLDC motor for generating a pulse signal in response to a rising-edge or a falling-edge of the speed signal. The current source circuit is controlled by the pulse signal. The first filter circuit is coupled to the current source circuit for generating an average signal. The error amplification circuit is coupled to receive the average signal and a speed-reference signal for generating a speed-control signal. The PWM circuit generates a switching signal to drive the BLDC motor in response to the speed-control signal. A pulse width of the switching signal is determined by the speed-control signal. The error amplification circuit comprises a second filter circuit for generating the speed-control signal to an input of the PWM circuit. The speed signal is generated by a hall-sensing device equipped with the BLDC motor.

The PWM circuit comprises an oscillator, a flip-flop and a comparator. The oscillator generates a clock signal and a ramp signal. The flip-flop generates the switching signal. The comparator receives the ramp signal and the speed-control signal for generating a reset signal. The clock signal is utilized to enable the switching signal. The reset signal is utilized to disable the switching signal.

Another exemplary embodiment of a constant-speed control circuit for a BLDC motor comprises a pulse generator, a filter circuit, an error amplification circuit and a PWM circuit. The pulse generator receives a speed signal of the BLDC motor for generating a pulse signal in response to the speed signal. The filter circuit generates an average signal in response to the pulse signal. The error amplification circuit is coupled to receive the average signal and a speed-reference signal for generating a speed-control signal. The PWM circuit generates a switching signal to drive the BLDC motor in response to the speed-control signal. A pulse width of the switching signal is determined by the speed-control signal. A maximum pulse width of the pulse signal is limited by a maximum frequency of the speed signal of the BLDC motor. A bandwidth of the filter circuit is determined by a minimum frequency of the speed signal of the BLDC motor. The speed signal is generated by a hall-sensing device equipped with the BLDC motor.

The PWM circuit comprises an oscillator, a flip-flop and a comparator. The oscillator generates a clock signal and a ramp signal. The flip-flop generates the switching signal. The comparator receives the ramp signal and the speed-control signal for generating a reset signal. The clock signal is utilized to enable the switching signal. The reset signal is utilized to disable the switching signal.

It is to be understood that both the foregoing general descriptions and the following detailed descriptions are exemplary, and are intended to provide further explanation of the invention as claimed. Still further objects and advantages will become apparent from a consideration of the ensuing description and drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
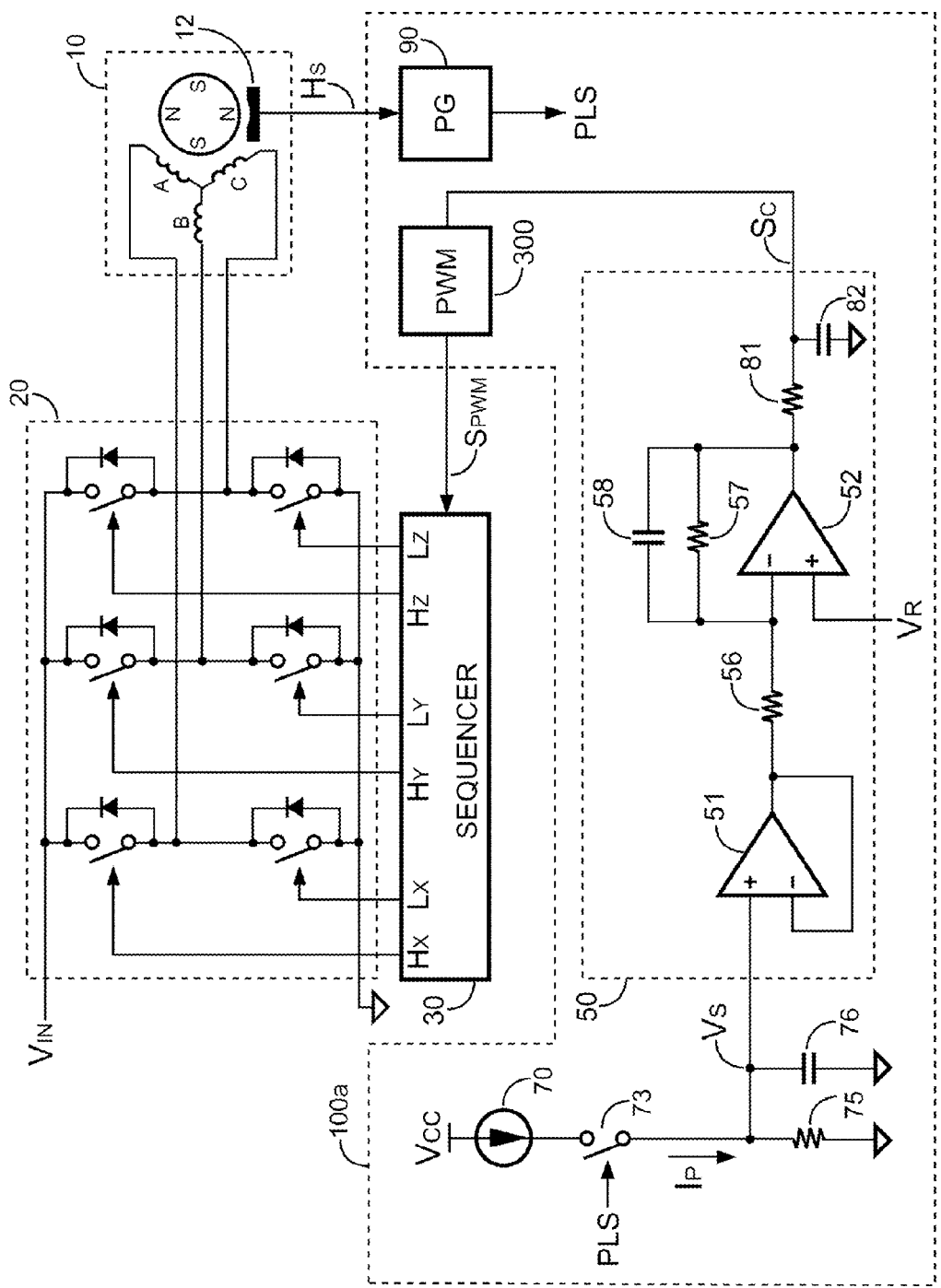
FIG. 1 shows an embodiment of the constant-speed control circuit of the present invention.

The present invention provides a constant-speed control circuit for BLDC (brush-less direct current) motors. FIG. 1 shows an embodiment of a constant-speed control circuit 100a of the present invention. The constant-speed control circuit 100a comprises a pulse generator (PG) 90, a current source circuit, a first filter circuit, an error amplification circuit 50 and a PWM (pulse width modulation) circuit (PWM) 300. The pulse generator 90 is coupled to detect a speed signal $H_S$ of a BLDC motor 10 for generating a pulse signal PLS in response to a rising-edge or a falling-edge of the speed signal $H_S$. The speed signal $H_S$ is generated by a hall-sensing device 12 equipped with the BLDC motor 10. A resistor 75 and a capacitor 76 are connected in parallel to form the first filter circuit. A current source 70 and a switch 73 are connected in series to form the current source circuit. The switch 73 is connected between the current source 70 and the first filter circuit. As the pulse signal PLS is enabled, the switch 73 will be turned on to conduct a current $I_P$ of the current source 70 to the first filter circuit. The first filter circuit receives the current $I_P$ to generate an average signal $V_S$ across the capacitor 76. The error amplification circuit 50 comprises error amplifiers 51 and 52, resistors 56 and 57, a capacitor 58 and a second filter circuit. The average signal $V_S$ is supplied to a positive terminal of the error amplifier 51. A negative terminal of the error amplifier 51 is connected to an output terminal of the error amplifier 51. The resistor 56 is connected between the output terminal of the error amplifier 51 and a negative terminal of the error amplifier 52. A positive terminal of the error amplifier 52 is supplied with a speed-reference signal $V_R$. The resistor 57 and the capacitor 58 are connected in parallel between the negative terminal and an output terminal of the error amplifier 52. A resistor 81 and a capacitor 82 are connected in series between the output terminal of the error amplifier 52 and a ground reference to form the second filter circuit. A joint of the resistor 81 and the capacitor 82 is an output of the error amplification circuit 50. The error amplification circuit 50 is coupled to receive the average signal $V_S$ and the speed-reference signal $V_R$ for generating a speed-control signal $S_C$. The resistors 56 and 57 determine the gain of the error amplification circuit 50. The capacitor 58 is utilized to determine the bandwidth of the error amplification circuit 50. The PWM circuit 300 receives the speed-control signal $S_C$ for generating a switching signal $S_{PWM}$ in response to the speed-control signal $S_C$. The pulse width of the switching signal $S_{PWM}$ is determined by the speed-control signal $S_C$.

The sequencer 30 and the driving circuit 20 form a three-phase BLDC driver. The hall-sensing device 12 equipped with the BLDC motor 10 generates the speed signal $H_S$. Output signals $H_X$, $L_X$ $H_Y$, $L_Y$, $H_Z$ and $L_Z$ of the sequencer 30 are coupled to drive the BLDC motor 10 via the driving circuit 20 in response to the switching signal $S_{PWM}$. The pulse widths of the output signals $H_X$, $L_X$ $H_Y$, $L_Y$, $H_Z$ and $L_Z$ of the sequencer 30 are determined by the pulse width of the switching signal $S_{PWM}$. The pulse width of the switching signal $S_{PWM}$ is correlated to a voltage level of the speed-control signal $S_C$.

Figure 2:
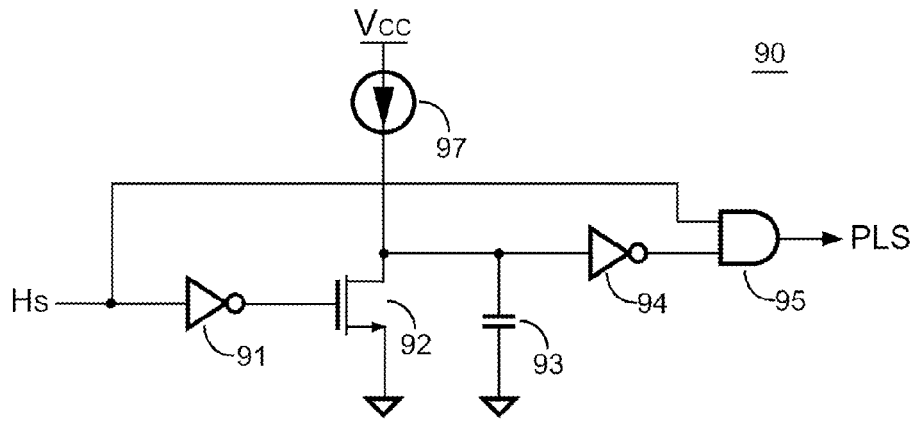
FIG. 2 shows an embodiment of a pulse generator of the constant-speed control circuit according to the present invention.
Figure 3:
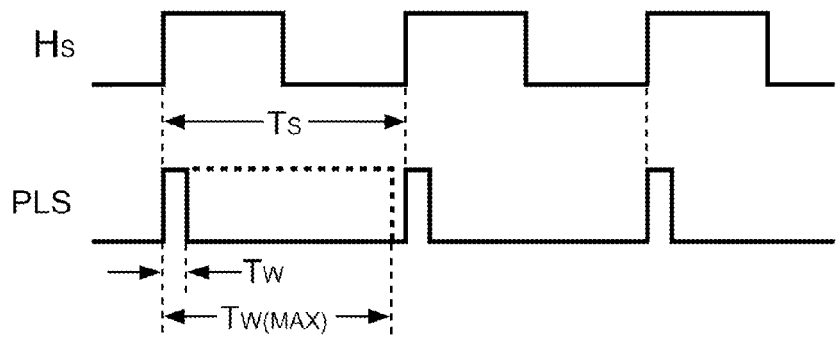
FIG. 3 shows the waveforms of a speed signal and a pulse signal.

FIG. 2 shows an embodiment of the pulse generator 90 according to the present invention. The pulse generator 90 comprises a current source 97, inverters 91 and 94, a transistor 92, a capacitor 93 and an AND gate 95. An input of the inverter 91 and a first input of the AND gate 95 receives the speed signal $H_S$. An output of the inverter 91 is connected to a gate of the transistor 92. The current source 97 is connected between a supply voltage $V_{CC}$ and a drain of the transistor 92. A source of the transistor 92 is connected to the ground reference. The capacitor 93 is connected between the drain of the transistor 92 and the ground reference. The inverter 94 is connected between the drain of the transistor 92 and a second input of the AND gate 95. An output of the AND gate 95 generates the pulse signal PLS. The pulse generator 90 generates the pulse signal PLS in response to the rising-edge of the speed signal $H_S$. FIG. 3 shows the waveforms of the speed signal $H_S$ and the pulse signal PLS. Referring to FIG. 2 and FIG. 3 a pulse width $T_W$ of the pulse signal PLS is fixed and is determined by a current of the current source 97 and a capacitance of the capacitor 93. A maximum pulse width $T_{W(MAX)}$ of the pulse signal PLS is limited by the highest operating speed of the BLDC motor 10. The highest operating speed of the BLDC motor 10 also refers to the maximum frequency of the speed signal $H_S$ thereof. That is, the maximum pulse width $T_{W(MAX)}$ of the pulse signal PLS is kept smaller than a minimum of a period $T_S$ of the speed signal $H_S$.

Referring to FIG. 3, in an embodiment of the invention, the pulse signal PLS is generated at the rising-edge of the speed signal $H_S$. In another embodiment of the invention (not shown in the drawings), the pulse signal PLS is generated at the falling-edge of the speed signal $H_S$.

Figure 4A:
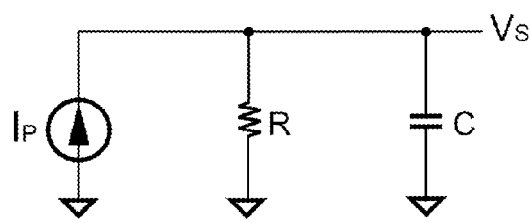
FIG. 4A shows an equivalent circuit of a first filter circuit according to the present invention.
Figure 4B:
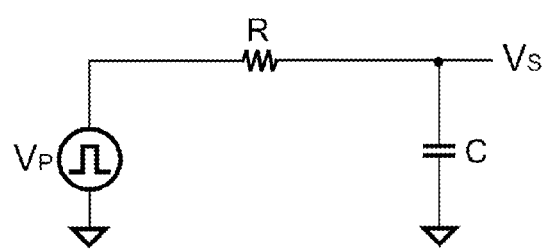
FIG. 4B shows an equivalent circuit of the first filter circuit as shown in FIG. 4A.

FIG. 4A shows a current $I_P$ provided by the current source 70 charging the capacitor 76 (denoted as C) of the first filter circuit. The resistor 75 of the first filter circuit is denoted as R. A current of the current source 70, a resistance of the resistor 75 and a capacitance of the capacitor 76 determine a bandwidth of the first filter circuit. The bandwidth of the first filter circuit is also determined by the lowest operating speed of the BLDC motor 10. The lowest operating speed of the BLDC motor 10 also refers to the minimum frequency of the speed signal $H_S$. FIG. 4B shows an equivalent circuit of the FIG. 4A.

$$V_P = I_P \times R \quad (1)$$

Where $V_P$ is an equivalent voltage source of the first filter circuit, $I_P$ is the current of the current source 70, and R is the resistance of the resistor 75.

Figure 4C:
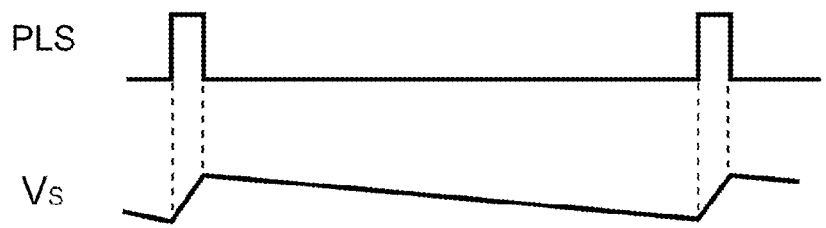
FIGS. 4C and 4D respectively show the waveforms of pulse signal PLS and an average signal VS, when a BLDC motor operates at lower and higher speeds.
Figure 4D:
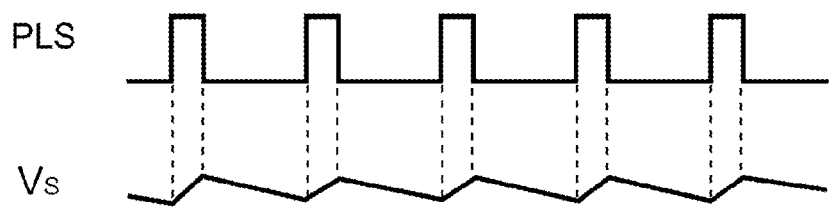

FIGS. 4C and 4D respectively show the waveforms of the pulse signal PLS and the average signal $V_S$ when the BLDC motor 10 operates at a lower speed and a higher speed.

Figure 5:
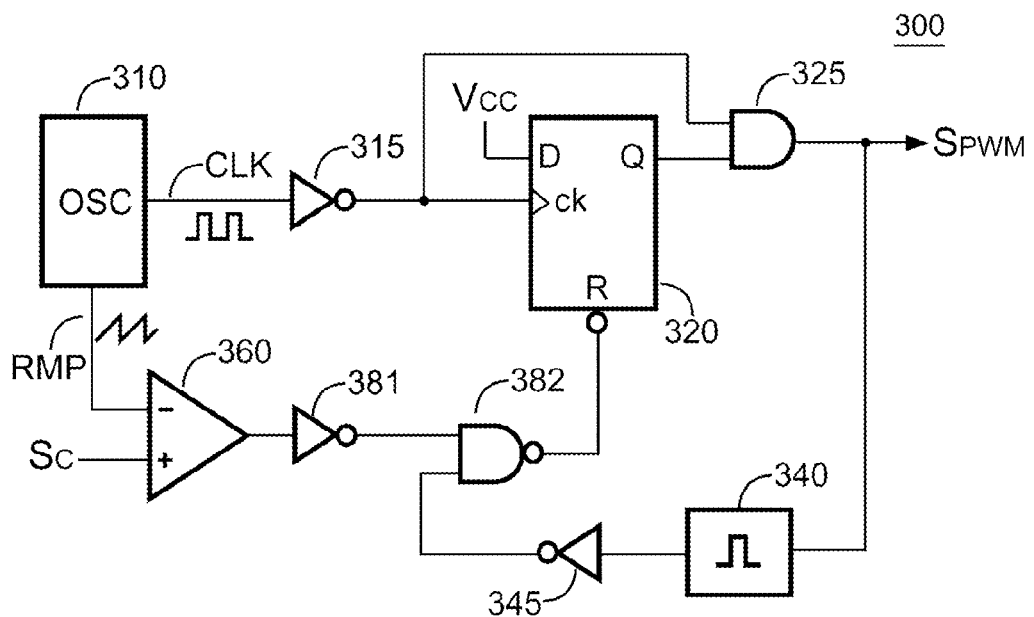
FIG. 5 shows an embodiment of a PWM circuit of the constant-speed control circuit according to the present invention.

FIG. 5 shows an embodiment of the PWM circuit 300 according to the present invention. The PWM circuit 300 comprises an oscillator (OSC) 310, inverters 315, 345 and 381, a comparator 360, a NAND gate 382, an AND gate 325, a flip-flop 320 and a one-shot circuit 340. The oscillator 310 generates a clock signal CLK. The pulse width of the clock signal CLK determines the maximum pulse width of the switching signal $S_{PWM}$. The clock signal CLK is supplied to a first input of the AND gate 325 and a clock-input ck of the flip-flop 320 via the inverter 315. The flip-flop 320 is thus enabled in response to the clock signal CLK. An output of the flip-flop 320 is further connected to a second input of the AND gate 325 for generating the switching signal $S_{PWM}$. The oscillator 310 further generates a ramp signal RMP which is coupled to a negative terminal of the comparator 360. The speed-control signal $S_C$ is supplied to a positive terminal of the comparator 360. Through the inverter 381 and the NAND gate 382, an output of the comparator 360 generates a reset signal to reset the flip-flop 320 for disabling the switching signal $S_{PWM}$. An input of the one-shot circuit 340 receives the switching signal $S_{PWM}$. An output of the one-shot circuit 340 is connected to an input of the inverter 345. An output of the inverter 345 is connected to an input of the NAND gate 382.

Figure 6:
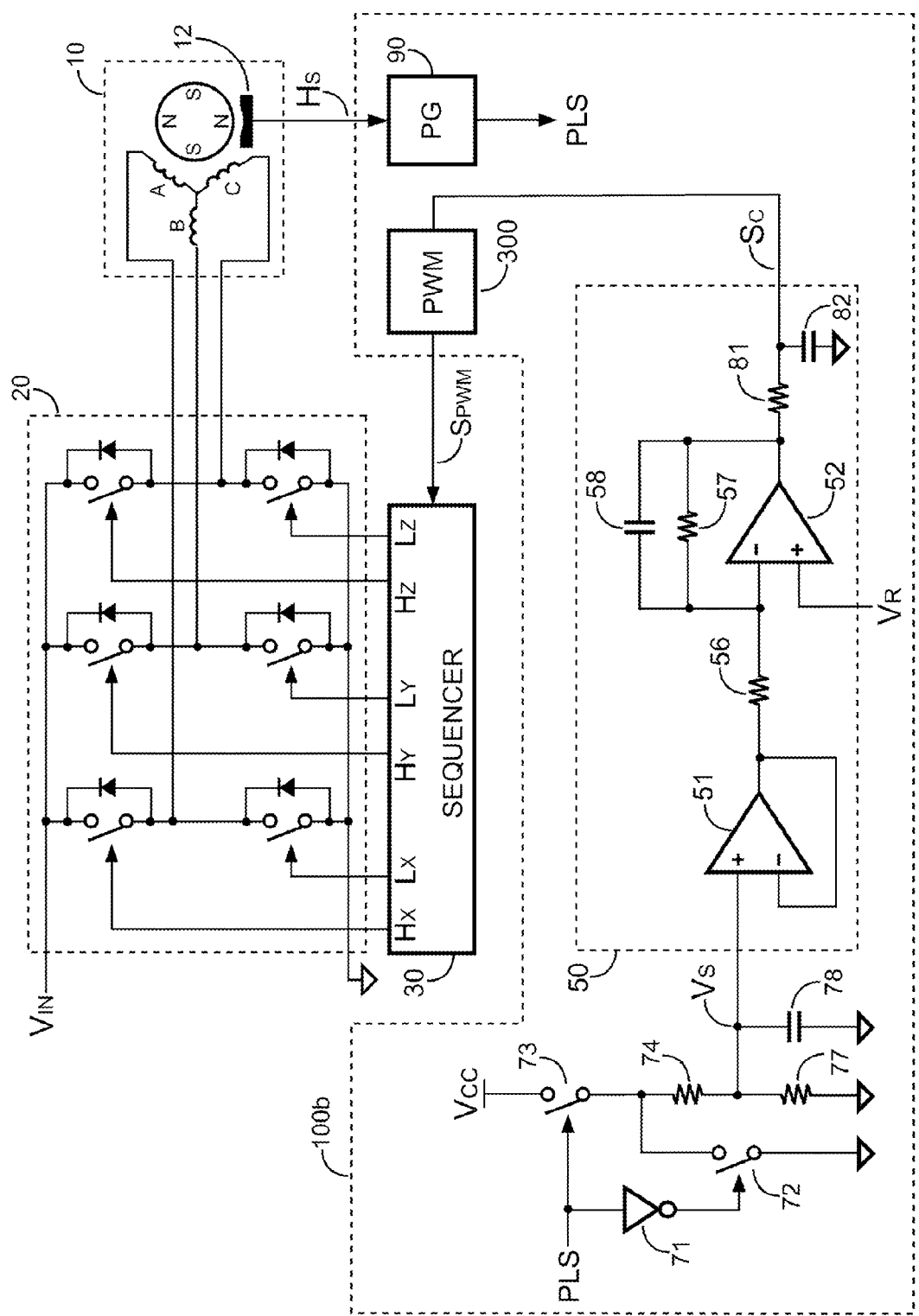
FIG. 6 shows another embodiment of the constant-speed control circuit of the present invention.

FIG. 6 shows another embodiment of a constant-speed control circuit 100b of the present invention. The constant-speed control circuit 100b comprises a pulse generator (PG) 90, switches 72 and 73, an inverter 71, a filter circuit, an error amplification circuit 50 and a PWM circuit (PWM) 300. The pulse generator 90 receives a speed signal $H_S$ of the BLDC motor 10 for generating a pulse signal PLS in response to the speed signal $H_S$. The switch 73 is controlled by the pulse signal PLS. The switch 72 is controlled by the pulse signal PLS via the inverter 71. The filter circuit is developed by resistors 74 and 77 and a capacitor 78. The filter circuit is coupled to the switches 72 and 73 for generating an average signal $V_S$. The structure of the error amplification circuit 50 is the same as the above description of FIG. 1, thus omitted here. The error amplification circuit 50 is coupled to receive the average signal $V_S$ and a speed-reference signal $V_R$ for generating a speed-control signal $S_C$. The PWM circuit 300 generates the switching signal $S_{PWM}$ to drive the BLDC motor 10 via a sequencer 30 and a driving circuit 20 in response to the speed-control signal $S_C$. The pulse width of the switching signal $S_{PWM}$ is determined by the speed-control signal $S_C$.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A speed-control circuit for a BLDC (Brushless Direct Current) motor comprising:
   a pulse generator, coupled to detect a speed signal of said BLDC motor for generating a pulse signal in response to a rising-edge or a falling-edge of said speed signal;
   a current source circuit, controlled by said pulse signal;
   a first filter circuit, coupled to said current source circuit, for generating an average signal;
   an error amplification circuit, coupled to receive said average signal and a speed-reference signal for generating a speed-control signal; and
   a PWM (Pulse Width Modulation) circuit, generating a switching signal to drive said BLDC motor in response to said speed-control signal;
   wherein a pulse width of said switching signal is determined by said speed-control signal; and
   wherein said PWM circuit comprises:
   an oscillator, generating a clock signal and a ramp signal;
   a flip-flop, generating said switching signal; and
   a comparator, receiving said ramp signal and said speed-control signal and generating a reset signal;
   wherein said clock signal is utilized to enable said switching signal, and said reset signal is utilized to disable said switching signal.

2. The speed-control circuit as claimed in claim 1, wherein said error amplification circuit comprises:
   a second filter circuit, generating said speed-control signal to an input of said PWM circuit.

3. The speed-control circuit as claimed in claim 1, wherein said speed signal is generated by a hall-sensing device equipped with said BLDC motor.

4. A constant-speed control circuit for a BLDC (Brushless Direct Current) motor comprising:
   a pulse generator, receiving a speed signal of said BLDC motor for generating a pulse signal in response to said speed signal;
   a first switch, having a first terminal coupled to a supply voltage and a second terminal, wherein the first switch is controlled by the pulse signal;
   an invertor receiving the pulse switch;
   a second switch, having a first terminal coupled to the second terminal of the first switch and a second terminal coupled to a ground reference, wherein the second switch is controlled by the pulse switch via the invertor;
   a filter circuit, coupled to the second terminal of the first switch, generating an average signal in response to said pulse signal, wherein the filter circuit comprises:
   a first resistor, having a first terminal coupled to the second terminal of the first switch and a second terminal;
   a second resistor, having s first terminal coupled to the second terminal of the first resistor and a second terminal coupled to the ground reference; and
   a capacitor coupled between the second terminal of the first resistor and the ground reference, wherein the average signal is generated at the second terminal of the first resistor;
   an error amplification circuit, coupled to receive said average signal and a speed-reference signal for generating a speed-control signal; and
   a PWM (Pulse Width Modulation) circuit, generating a switching signal to drive said BLDC motor in response to said speed-control signal;
   wherein a pulse width of said switching signal is determined by said speed-control signal.

5. The constant-speed control circuit as claimed in claim 4, wherein a maximum pulse width of said pulse signal is limited by a maximum frequency of said speed signal of said BLDC motor.

6. The constant-speed control circuit as claimed in claim 4, wherein a bandwidth of said filter circuit is determined by a minimum frequency of said speed signal of said BLDC motor.

7. The constant-speed control circuit as claimed in claim 4, wherein said speed signal is generated by a hall-sensing device equipped with said BLDC motor.

8. The constant-speed control circuit as claimed in claim 4, wherein said PWM circuit comprises:
   an oscillator, generating a clock signal and a ramp signal;
   a flip-flop, generating said switching signal; and
   a comparator, receiving said ramp signal and said speed-control signal and generating a reset signal;
   wherein said clock signal is utilized to enable said switching signal, and said reset signal is utilized to disable said switching signal.

* * * * *